United States Patent [19]

Reinert et al.

[11] Patent Number: 4,955,454

[45] Date of Patent: Sep. 11, 1990

[54] MODULAR BOLT ASSEMBLY FOR STEERING SHAFT LOCK

[75] Inventors: Karl A. Reinert; Edmund L. Rendon, Jr., both of Saginaw, Mich.

[73] Assignee: General Motors Corporation, Detroit, Mich.

[21] Appl. No.: 366,092

[22] Filed: Jun. 13, 1989

[51] Int. Cl.$^5$ ............................................ B60R 25/02
[52] U.S. Cl. ...................................... 180/287; 70/252
[58] Field of Search .................. 180/287, 289; 70/252

[56] References Cited

U.S. PATENT DOCUMENTS

| | | | |
|---|---|---|---|
| 1,694,506 | 12/1928 | Hershay | 70/252 |
| 2,890,581 | 6/1959 | Lewis | 280/287 |

OTHER PUBLICATIONS

Saginaw Steering Gear Drawing No. 26007832 sht 1 of 2, dated Jan. 16, 1987.

Primary Examiner—Richard A. Bertsch
Assistant Examiner—Tamara L. Finlay
Attorney, Agent, or Firm—Saul Schwartz

[57] ABSTRACT

A modular bolt assembly in an anti-theft steering shaft lock in an automotive steering column includes a support tube, a bolt in the support tube, a plastic retainer in an open end of the support tube and a spring between the bolt and the retainer. The retainer has three trunnions symmetrically arrayed around the its center which are received in slots in the support tube. The spring seats at the center of the retainer and biases the retainer opposite the bolt until the trunnions seat at closed ends of the slots in the support tube whereby the retainer is captured on the support tube.

4 Claims, 2 Drawing Sheets

MODULAR BOLT ASSEMBLY FOR STEERING SHAFT LOCK

FIELD OF THE INVENTION

This invention relates to anti-theft steering shaft locks on automotive steering columns.

BACKGROUND OF THE INVENTION

Steering columns manufactured by the Saginaw Division, General Motors Corporation, Saginaw, Mich., 48605 and used on current model Pontiac Grand Prix, Oldsmobile Cutlass Supreme, and Buick Regal vehicles have anti-theft steering shaft locks of the type including a slotted keeper on the steering shaft and a modular bolt assembly on a fixed part of the steering column. The modular bolt assembly is subassembled separate from the steering column and includes a generally rectangular support tube adapted for rigid attachment to the fixed part of the steering column, a slidable bolt in the support tube, a plastic retainer closing an open end of the support tube, and a spring between the retainer and the bolt urging the latter to an extended position projecting into a slot in the keeper and restricting rotation of the steering shaft. The retainer has integral flexible hooks which hold the retainer on the support tube against the bias of the spring but which are difficult to install and which are prone to looseness and loss during transport of the modular assemblies to steering column final assembly. A modular bolt assembly according to this invention incorporates a structurally more simple plastic retainer which is easier to assemble and which has superior retention and stability relative to the aforesaid hooked retainer.

SUMMARY OF THE INVENTION

This invention is a new and improved modular bolt assembly for an anti-theft steering shaft lock on an automotive steering column, the modular bolt assembly having a support tube for disposition on a stationary part of the steering column, a bolt slidably disposed in the support tube, a plastic retainer closing an open end of the support tube, and a spring disposed between the bolt and the retainer biasing the bolt to an extended position and the retainer to a position in which trunnions on the retainer are securely captured in slots in the support tube. In a preferred embodiment, the trunnions are arrayed in a triangular pattern around the spring for superior stability and the slots in the support tube include a pair of J-shaped slots in the sides of the support tube and a triangular or delta-shaped slot in the bottom of the support tube. The slots are located and oriented for easy installation of the retainer on the support tube.

DESCRIPTION OF A PREFERRED EMBODIMENT

Figure 1:
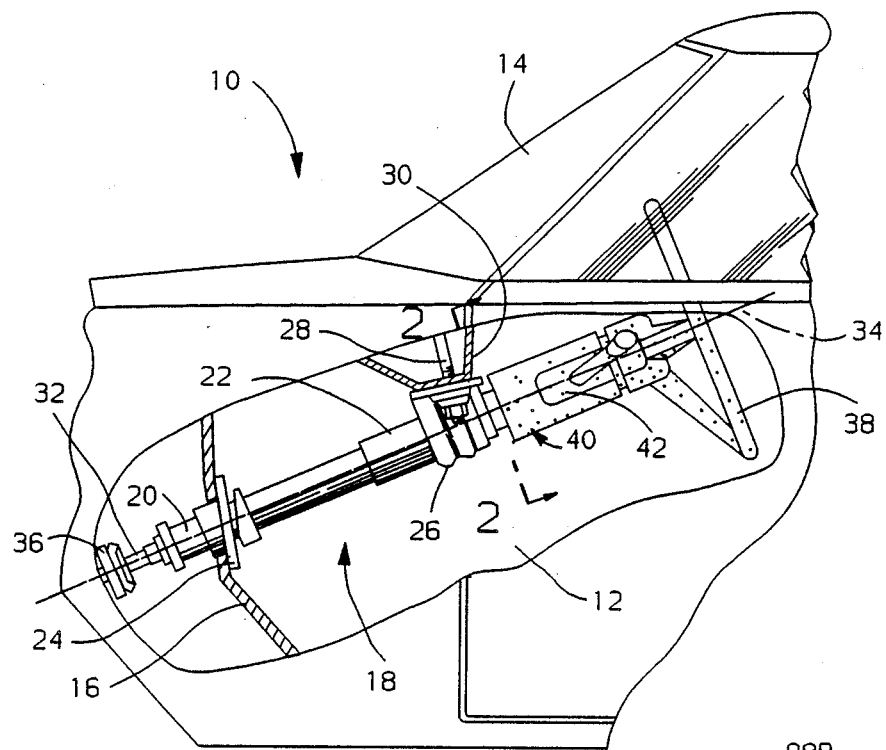
FIG. 1 is a fragmentary, broken-away side elevational view of an automobile having a steering column thereon with an anti-theft steering shaft lock including a modular bolt assembly according to this invention.

Referring to FIG. 1 and describing briefly the environment of the modular bolt assembly according to this invention, an automobile 10 has a passenger compartment 12 defined at the front by a windshield 14 and a panel assembly 16 below the windshield. A steering column 18 in the passenger compartment has a tubular lower mast jacket 20 and a tubular upper mast jacket 22 telescoped over the upper end of the lower mast jacket. The lower mast jacket is attached to the panel assembly 16 at a connection 24. A bracket 26 on the upper mast jacket carries releasable capsules, not shown, through which project respective ones of a pair of hanger bolts, only a single hanger bolt 28 appearing in FIG. 1. The hanger bolts are rigid extensions of an instrument panel support structure 30 of the vehicle and are threaded at their bottom ends to receive nuts whereby the upper mast jacket is connected to the vehicle. Upon forward impact, the capsules release from the bracket 26 to permit energy absorbing telescopic collapse of the upper mast jacket over the lower mast jacket in known fashion.

A steering shaft 32 is supported in the lower and upper mast jackets for rotation about a longitudinal axis 34 of the steering column. At one end, the steering shaft projects through the panel assembly 16 and is connected to a steering gear 36 of the vehicle. At the other end, the steering shaft projects beyond the upper end of the upper mast jacket 22 and receives a steering wheel 38 whereby the automobile 10 is steered by a driver in the passenger compartment in conventional fashion.

A bowl 40 is rigidly connected to the upper end of the upper mast jacket 22 between the steering wheel 38 and the instrument panel support structure 30. The bowl 40 is stationary and has a raised part 42 from which projects a control lever of a conventional multi-function switch, not shown, for a turn signal, a windshield wiper and a headlamp dimmer. The bowl 40 has a lock housing portion 44 on the opposite side of the steering shaft from the raised part 42 in which is supported a conventional cylinder lock, not shown, having a key operated rotatable barrel.

The barrel of the cylinder lock is connected to an ignition switch, not shown, of the vehicle and to an anti-theft steering shaft lock 46 housed within the bowl. The barrel has a locked position corresponding to an engine-off, parked condition of the vehicle and a plurality of unlocked positions corresponding to operating states of the vehicles ignition such as run and start. In the unlocked positions of the barrel, the steering shaft lock releases the steering shaft for unrestricted rotation relative to the mast jackets 20 and 22. In the locked position of the barrel, the steering shaft lock restricts rotation of the steering shaft to discourage vehicle theft by rendering the vehicle effectively unsteerable.

Figure 3:
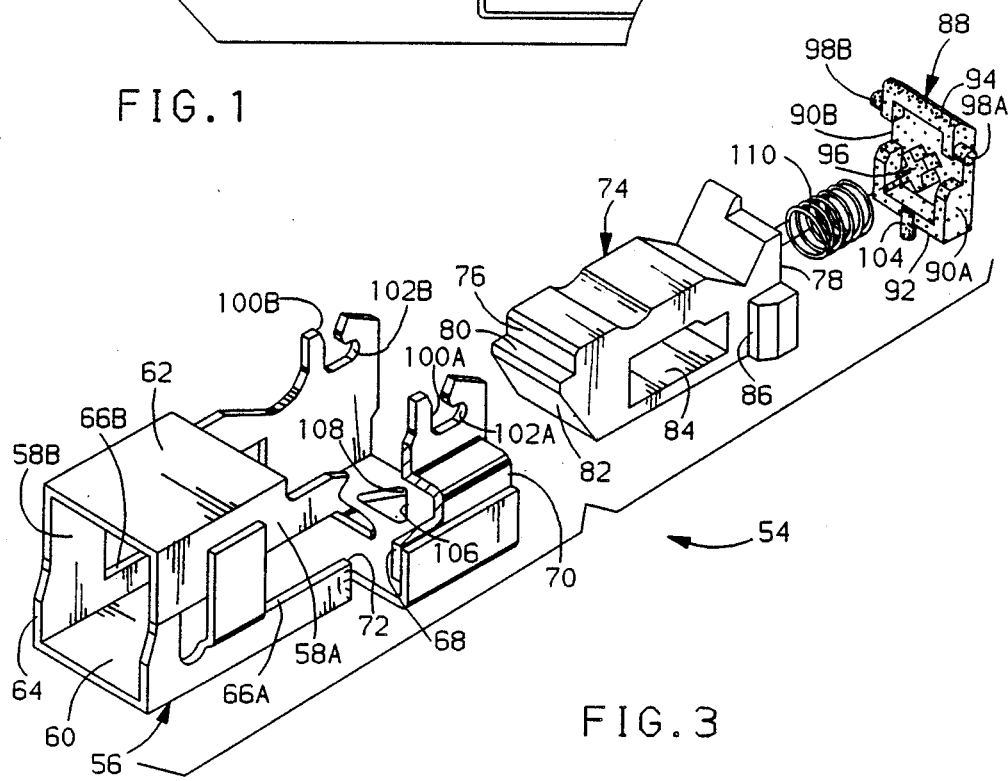
FIG. 3 is a partially broken-away exploded perspective view of the modular bolt assembly according to this invention.
Figure 2:
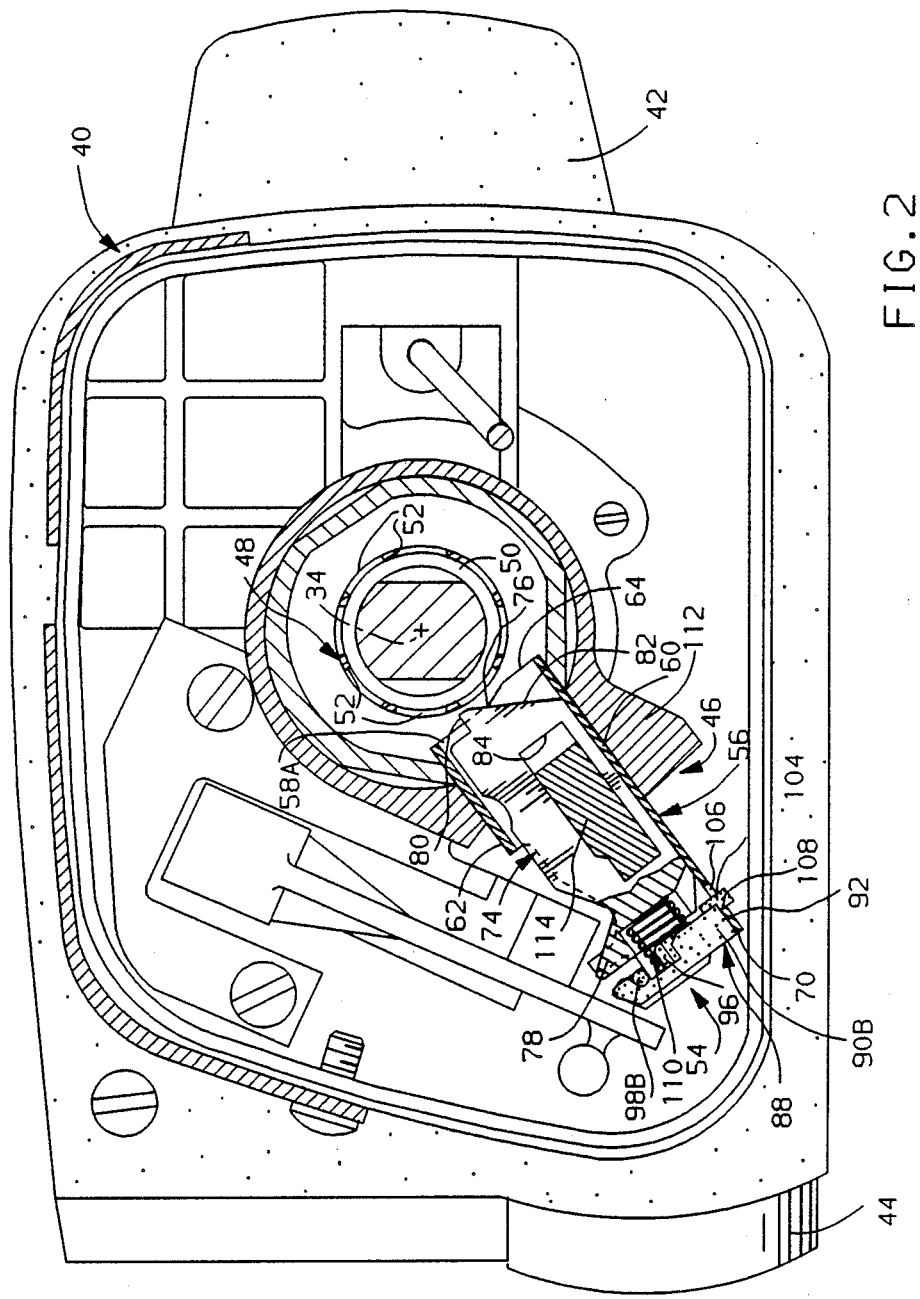
FIG. 2 is an enlarged sectional view taken generally along the plane indicated by lines 2—2 in FIG. 1.

As seen best in FIGS. 2 and 3, the anti-theft steering shaft lock 46 includes a keeper member in the form of a sleeve 48 disposed around and rigidly attached to the steering shaft 32. The diameter of the sleeve 48 exceeds the diameter of the portion of the steering shaft 32 immediately inboard of the sleeve so that an annular clearance space 50, FIG. 2, is defined between the shaft and the sleeve. The sleeve 48 is perforated by a plurality of angularly spaced slots 52. The anti-theft steering shaft lock 46 further includes a modular bolt assembly 54 according to this invention which cooperates with the sleeve 48 to restrict rotation of the steering shaft in the locked position of the cylinder lock barrel.

As seen best in FIG. 3, the modular bolt assembly 54 includes a support tube 56 which may conveniently be stamped from a flat sheet of metal, bent to the illustrated shape, and welded at adjoining or overlapping edges for rigidity. The support tube is generally rectangular in cross section and includes a pair of parallel side walls 58A-B, a full length bottom wall 60, and a partial length top wall 62 at a first or front end 64 of the support tube. The side walls 58A-B have longitudinally extending slots 66A-B therein for passage of an operating cam therethrough as more fully described below. In addition, the side wall 58A has a longitudinally extending tunnel 68 extending from a second or back end 70 of the support tube to a stop 72 defined by an exposed edge of the side wall 58A.

The modular bolt assembly 54 further includes a bolt 74 of generally rectangular cross section slidably disposed in the support tube 56. The bolt 74 includes a first or front end 76 and a second or back end 78 corresponding, respectively, to the front and back ends of the support tube. An abutment is defined on the front end 76 of the bolt and includes a flat side 80 and ramped side 82. A generally rectangular slot 84 is formed in the bolt 74 and registers with the slots 66A-B in the side walls 58A-B of the support tube. A shoulder 86 on a side of the bolt is slidably received in the tunnel 68 of the support tube and engages the stop 72 to prevent escape of the bolt through the front end of the support tube.

The modular bolt assembly 54 further includes a generally flat, rectangular plastic retainer 88. The retainer 88 has a pair of side edges 90A-B, a bottom edge 92 and a top edge 94 and includes a centrally located raised guide 96 on a front facing surface of the retainer. A pair of integral, aligned trunnions 98A-B extend from the side edges 90A-B, respectively, adjacent the top edge 94 and above the guide 96. The trunnions 98A-B seat in respective ones of a pair of J-shaped slots 100A-B in the side walls 58A-B of the support tube. Each slot 100A-B has a vertical open-ended portion perpendicular to the direction of movement of the bolt 74 and a horizontal closed-ended portion parallel to the direction of movement of the bolt. Each closed-ended portion terminates at a closed end 102A-B. A third integral trunnion 104 directly below the guide 96 extends from the mid-point of the bottom edge 92 of the retainer into a triangular or delta-shaped slot 106 in the bottom wall of the support tube. The slot 106 has sides converging toward an apex 108 in a transverse plane containing the closed ends 102A-B of the slots 100A-B.

A coil spring 110 of the modular bolt assembly 54 is disposed between the retainer 88 and the back end 78 of the bolt 74. The spring fits over the guide 96 for stability and is received in a pocket, not shown, on the back end of the bolt for the same purpose. The spring 110 biases the bolt 74 toward the front end of the support tube and the retainer toward the back end of the support tube thereby seating the trunnions 98A-B against the closed ends 102A-B of the slots 100A-B and the trunnion 104 against the apex 108 of the delta-shaped slot 106.

The support tube 56 is pressed into an appropriate opening in an internal web 112 of the bowl 40, FIG. 2, on the steering column 18 whereby the bolt 74 is oriented radially relative to the longitudinal axis 34 of the column. The spring 110 urges the bolt to an extended position, not shown, wherein the abutment on its front end projects into one of the slots 52. An operating cam 114 of the steering shaft lock 46 extends in the direction of longitudinal axis 34 through the registered slots 66A-B and 84 in the support tube 56 and the bolt 74. The operating cam is shiftable in the direction of longitudinal axis 34 by the cylinder lock barrel and is contoured such that the bolt 74 is in its extended position when the barrel is in its locked position and is withdrawn to a retracted position, FIG. 2, remote from the sleeve 48 whenever the barrel is in a position other than its locked position. In the extended position of the bolt, the flat side 80 of the abutment engages an edge of one of the slots 52 in the sleeve to restrict counterclockwise rotation, FIG. 2, of the sleeve and steering shaft. In the retracted position of the bolt, rotation of the steering shaft is unrestricted.

In operation, when the driver turns the ignition key to start the engine, the operating cam 114 shifts the bolt 74 to its retracted position. When the driver parks the vehicle and turns the key to the locked position of the barrel, the operating cam 114 releases the bolt 74 and the spring 110 urges the latter toward its extended position. If the abutment on the bolt happens to be in register with one of the slots 52 in the sleeve 48, the abutment penetrates the slot. If a slot and the abutment are not in registry, the spring biases the abutment against the sleeve and then into a slot as soon as the steering wheel is turned a few degrees.

The ramp side 82 of the abutment operates to cam the abutment out of the slots 52 when the steering shaft is rotated clockwise. Such rotation releases restoring torque on the steering shaft and is conveniently effected by the left hand of the driver while manipulating a key with the right hand to start the engine and unlock the steering shaft for normal operation.

The shape and relative orientation of the trunnions and slots on the retainer and support tube are important features of this invention and contribute to efficient subassembly of the modular bolt assembly 54, to stability of the spring, and to retention of the retainer 88 on the support tube. For example, the modular bolt assembly 54 may be subassembled as follows. The bolt 74 is inserted into the support tube 56 through the back end 70 of the latter and extended until the shoulder 86 engages the stop 72. With the spring 110 between the back end 78 of the bolt 74 and the retainer 88, the latter is tipped back about an axis through the aligned trunnions 98A-B and the trunnions are lowered into the J-shaped slots 100A-B.

With finger pressure on the retainer holding the trunnions 98A-B against the front edges of the J-shaped slots 100A-B and the spring 110 compressed, the retainer is pivoted about the trunnions 98A-B until the retainer is generally perpendicular to the bottom wall 60 of the support tube with the third trunnion in register with the delta-shaped slot 106. In that position, the spring 110 is around the guide 96 and compressed between the bolt 74 and the retainer 88. The retainer is then shifted toward the bottom wall 60 of the support tube until the trunnions 98A-B seat in the closed-ended portions of the J-shaped slots and the trunnion 104 enters the delta-shaped slot 106. Finger pressure on the retainer is then released and the spring 110 pushes the retainer toward the back end 70 of the support tube until the trunnions 98A-B seat against the closed ends 102A-B of the slots 100A-B and the trunnion 104 seats at the apex 108 of the slot 106.

In addition to the inherent simplicity of the subassembly procedure described above, the triangular orientation of the trunnions around the guide 96 on the retainer is an important feature of this invention because of the stability imparted to the retainer. That is, the retainer is inherently statically balanced around the guide so there is little or no tendency the retainer to tip and release the spring 110.

The embodiments of the invention in which an exclusive property or privilege is claimed as defined as follows:

1. In a modular bolt assembly in an anti-theft steering shaft lock on an automotive steering column, said modular bolt assembly including a support tube adapted for rigid attachment to a stationary part of said steering column and having a generally rectangular cross section, a bolt disposed in said support tube for radial bodily shiftable movement relative to a longitudinal axis of said steering column between an extended position engaging a keeper on a steering shaft of said steering column and restricting rotation thereof and a retracted position remote from said keeper, a generally rectangular flat retainer in an open end of said support tube, and a spring seated on said retainer and on said bolt and biasing said bolt in a first direction toward said extended position and said retainer in an opposite second direction, the improvement comprising:

means on one of said retainer and said support tube defining a plurality of at least three trunnions disposed in a plane perpendicular to the direction of movement of said bolt and arrayed symmetrically around said spring, and means on the other of said retainer and said support tube defining a corresponding plurality of at least three slots for receiving respective ones of said trunnions and each including a closed-ended portion extending parallel to the direction of movement of said bolt to a closed end, said spring moving said retainer in said second direction until each of said trunnions engages said closed end of the corresponding one of said closed-ended slots and biasing said trunnions against said closed ends to maintain said retainer on said support tube.

2. The modular bolt assembly recited in claim 1 wherein each of said trunnions is defined on said retainer and each of said slots is defined on said support tube.

3. The modular bolt assembly recited in claim 2 wherein said retainer is plastic.

4. In a modular bolt assembly in an anti-theft steering shaft lock in on automotive steering column, said modular bolt 54 assembly including a generally rectangular support tube 56 adapted for rigid attachment to a stationary part of said steering column 18 and having a pair of parallel side walls 58 and a bottom wall 60 between said pair of side walls, a generally rectangular bolt 74 disposed in said support tube for generally radial bodily shiftable movement relative to a longitudinal axis 34 of said steering column 18 between an extended position engaging a keeper 48 on a steering shaft 32 of said steering column and restricting rotation thereof and a retracted position remote from said keeper, a generally rectangular planar plastic retainer 88 having a top edge 94 and a pair of side edges 90 juxtaposed respective ones of said side walls of said support tube and a bottom edge 92 juxtaposed said bottom wall of said support tube, and a spring 110 disposed between said plastic retainer and said bolt biasing said bolt in a first direction toward said extended position and said retainer in an opposite second direction, the improvement comprising:

means on said retainer 88 defining a pair of aligned trunnions 98 in the plane of said retainer extending in opposite directions from respective ones of said pair of side edges 90 of said retainer generally adjacent said top edge of said retainer, means on said plastic retainer defining a third trunnion 104 in the plane of said retainer extending perpendicular to said bottom edge 92 generally at the mid-point of said bottom edge so that said third trunnion and said pair of aligned trunnions are arrayed symmetrically around the center of said plastic retainer, means on said plastic retainer defining a raised guide 96 at the center of said retainer on a side thereof facing said bolt, said guide receiving thereover an end of said spring whereby said spring seats on said retainer at the center thereof, means on said support tube 56 defining a pair of J-shaped slots 100 in respective ones of said parallel side walls for receiving respective ones of said pair of aligned trunnions and each having an open-ended portion extending perpendicular to the direction of movement of said bolt and a closed-ended portion 102 connected to said open-ended portion and extending from said open-ended portion in said second direction to a closed end 102, and means on said support tube defining a delta-shaped slot 106 in said bottom wall for receiving said third trunnion and having a pair of sides converging in said second direction to an apex 108 located in a transverse plane of said support tube aligned with said closed ends of said closed-ended portions of said J-shaped slots whereby said spring biases said retainer to a position wherein each of said pair of aligned trunnions is captured at said closed end of the corresponding one of said closed-ended portions of said J-shaped slots and said third trunnion is captured at said apex of said delta-shaped slot.

* * * * *